US009053458B2

(12) United States Patent
Adar et al.

(10) Patent No.: US 9,053,458 B2
(45) Date of Patent: Jun. 9, 2015

(54) SYSTEM AND METHOD FOR PROFILING CLIENTS WITHIN A SYSTEM FOR HARVESTING COMMUNITY KNOWLEDGE

(75) Inventors: Eytan Adar, Palo ALto, CA (US);
Rajan Mathew Lukose, Palo Alto, CA (US); Joshua Rogers Tyler, Stanford, CA (US); Caesar Sengupta, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 42 days.

(21) Appl. No.: 13/568,391

(22) Filed: Aug. 7, 2012

(65) Prior Publication Data

US 2013/0041906 A1 Feb. 14, 2013

Related U.S. Application Data

(63) Continuation of application No. 10/106,096, filed on Mar. 25, 2002, now abandoned.

(51) Int. Cl.
*G06F 15/16* (2006.01)
*G06Q 10/10* (2012.01)
*G09B 7/00* (2006.01)
*H04L 29/06* (2006.01)
*H04L 29/08* (2006.01)

(52) U.S. Cl.
CPC ........ *G06Q 10/10* (2013.01); *G09B 7/00* (2013.01); *H04L 29/06* (2013.01); *H04L 67/22* (2013.01); *H04L 69/329* (2013.01)

(58) Field of Classification Search
CPC ........ H04L 67/22; H04L 67/30; H04L 63/306
USPC .................. 709/204, 206, 217, 223
See application file for complete search history.

(56) References Cited

U.S. PATENT DOCUMENTS

| 5,029,085 | A | | 7/1991 | Ito |
| 5,446,891 | A | | 8/1995 | Kaplan |
| 5,689,708 | A | | 11/1997 | Regnier |
| 5,710,884 | A | * | 1/1998 | Dedrick ........................ 709/217 |
| 5,870,559 | A | * | 2/1999 | Leshem et al. ................ 709/224 |
| 5,916,302 | A | * | 6/1999 | Dunn et al. .................... 709/204 |
| 6,029,195 | A | * | 2/2000 | Herz ............................. 725/116 |
| 6,115,709 | A | | 9/2000 | Gilmour |
| 6,119,114 | A | | 9/2000 | Smadja |
| 6,154,783 | A | | 11/2000 | Gilmour |
| 6,230,269 | B1 | | 5/2001 | Spies |

(Continued)

OTHER PUBLICATIONS

Adriana Vivacqua & Henry Lieberman—Agents to Assist in Finding Help; CHI 2000, Apr. 1-6, 2000; pp. 65-72.
Ackerman—Answer Garden 2: Merging Organizational Memory with Collaborative Help; Computer Supported Cooperative Work 1996; pp. 97-105.
Borenstein—Computational Mail as Network Infrastructure for Computer-Supported Cooperative Work; CSCW 1992 Proceedings; pp. 67-74.

(Continued)

*Primary Examiner* — Thu Ha Nguyen
(74) *Attorney, Agent, or Firm* — Hewlett-Packard Patent Department

(57) ABSTRACT

A privacy-preserving system and method is disclosed for profiling clients within a system for knowledge management. The method of the present invention discloses steps for generating a client profile in support of receiving and processing messages using scoring techniques and/or filtering techniques. The method of the present invention further includes steps for generating a client profile in support of a method for generating and obtaining responses to messages using scoring techniques and/or filtering techniques. The system of the present invention, includes all means for implementing the method.

20 Claims, 6 Drawing Sheets

(56) References Cited

U.S. PATENT DOCUMENTS

| | | | |
|---|---|---|---|
| 6,286,043 B1* | 9/2001 | Cuomo et al. | 709/223 |
| 6,363,415 B1* | 3/2002 | Finney et al. | 709/206 |
| 6,578,025 B1 | 6/2003 | Pollack | |
| 6,609,106 B1* | 8/2003 | Robertson | 705/5 |
| 6,633,316 B1* | 10/2003 | Maddalozzo et al. | 715/854 |
| 6,681,247 B1* | 1/2004 | Payton | 709/217 |
| 6,701,362 B1* | 3/2004 | Subramonian et al. | 709/224 |
| 6,895,437 B1* | 5/2005 | Cowdrey et al. | 709/224 |
| 6,925,442 B1* | 8/2005 | Shapira et al. | 705/7.33 |
| 7,152,106 B2* | 12/2006 | Cohen et al. | 709/224 |
| 2001/0013009 A1* | 8/2001 | Greening et al. | 705/10 |
| 2001/0037407 A1* | 11/2001 | Dragulev et al. | 709/250 |
| 2002/0042923 A1* | 4/2002 | Asmussen et al. | 725/92 |
| 2002/0073058 A1* | 6/2002 | Kremer et al. | 707/1 |
| 2002/0083179 A1* | 6/2002 | Shaw et al. | 709/227 |
| 2002/0152284 A1* | 10/2002 | Cambray et al. | 709/218 |
| 2002/0174185 A1* | 11/2002 | Rawat et al. | 709/206 |
| 2002/0198973 A1* | 12/2002 | Besaw | 709/223 |
| 2003/0023715 A1* | 1/2003 | Reiner et al. | 709/224 |
| 2003/0088544 A1 | 5/2003 | Kan | |
| 2003/0115333 A1* | 6/2003 | Cohen et al. | 709/227 |
| 2003/0123465 A1* | 7/2003 | Donahue | 370/401 |
| 2003/0167402 A1* | 9/2003 | Stolfo et al. | 713/200 |
| 2003/0172067 A1 | 9/2003 | Adar | |
| 2003/0177118 A1* | 9/2003 | Moon et al. | 707/5 |
| 2003/0177127 A1 | 9/2003 | Goodwin | |
| 2003/0217106 A1* | 11/2003 | Adar et al. | 709/206 |
| 2004/0001476 A1 | 1/2004 | Islam | |
| 2004/0002896 A1 | 1/2004 | Alanen | |
| 2004/0034706 A1* | 2/2004 | Cohen et al. | 709/225 |
| 2004/0039756 A1 | 2/2004 | Bromley | |
| 2004/0039786 A1* | 2/2004 | Horvitz et al. | 709/207 |
| 2004/0073644 A1 | 4/2004 | Koch | |
| 2004/0122730 A1* | 6/2004 | Tucciarone et al. | 705/14 |
| 2005/0256951 A1 | 11/2005 | Shapira | |
| 2006/0123105 A1* | 6/2006 | Parekh et al. | 709/223 |
| 2008/0077669 A1* | 3/2008 | Ozveren et al. | 709/205 |
| 2008/0244053 A1* | 10/2008 | Sampson et al. | 709/223 |
| 2009/0077163 A1* | 3/2009 | Ertugrul et al. | 709/203 |
| 2009/0287683 A1* | 11/2009 | Bennett | 707/5 |
| 2012/0221544 A1* | 8/2012 | Hu et al. | 707/708 |
| 2012/0271805 A1* | 10/2012 | Holenstein et al. | 707/706 |
| 2013/0254217 A1* | 9/2013 | Xu | 707/754 |

OTHER PUBLICATIONS

Reiter—Crowds: Anonymity for Web Transaction; AT&T Labs—Research; 1998; pp. 1-23.

Seid et al., Expert Finding Systems for Organizations: Problem and Domain Analysis and the Demoir Approach; Journal of Organizational Computing, 2002, pp. 1-23.

McDonald, Expertise Recommender: A Flexible Recommendation System and Architecture; CSCW 2000 Dec. 2-6, 2000—Philadelphia PA; pp. 231-240.

Leonard N. Foner; Yenta: A Multi-Agent, Referral-Based Matchmaking System; Autonomous Agents 1997—Marina del Rey CA; pp. 301-307.

U.S. Appl. No. 10/093,658, Non-Final Rejection dated Sep. 20, 2004, pp. 1-22 and attachments.

U.S. Appl. No. 10/093,658, Final Rejection dated Apr. 7, 2005, pp. 1-25.

U.S. Appl. No. 10/093,658, Non-Final Rejection dated Oct. 19, 2005, pp. 1-27 and attachments.

U.S. Appl. No. 10/093,658, Non-Final Rejection dated Apr. 17, 2006, pp. 1-27 and attachments.

U.S. Appl. No. 10/093,658, Non-Final Rejection dated Oct. 5, 2006, pp. 1-28 and attachments.

U.S. Appl. No. 10/093,658, Final Rejection dated May 7, 2007, pp. 1-30.

U.S. Appl. No. 10/093,658, Non-Final Rejection dated Feb. 13, 2008, pp. 1-25 and attachments.

U.S. Appl. No. 10/093,658, Final Rejection dated Sep. 18, 2008, pp. 1-26.

Tacit—Expertise Automation Overview—Web Site: http://www.tacit.com/products/index.html dated on or before Feb. 4, 2002 (23 pages).

Ask Me—Web Site: http://www.askmecorp.com/product/default.asp dated on or before Jan. 16, 2012 (1 page).

EXP Systems—Products Web Site: http://www.exp.com/app/display?page=corp_products_modules dated on or before Dec. 17, 2001 (5 pages).

Keen Web Site: http//www.keen.com/documents/corpinfo/companyprofile.asp dated on or before Dec. 17, 2001 (2 pages).

Ian Clarke et al., Freenet: A Distributed Anonymous Information Storage and Retrieval System, Jul. 1, 2000 (9 pages).

* cited by examiner

SYSTEM AND METHOD FOR PROFILING CLIENTS WITHIN A SYSTEM FOR HARVESTING COMMUNITY KNOWLEDGE

CROSS-REFERENCE TO CO-PENDING APPLICATION

This application is a continuation of U.S. patent application Ser. No. 10/106,096, filed Mar. 25, 2002 now abandoned, which is hereby incorporated by reference.

BACKGROUND OF THE INVENTION

1. Field of the Invention

The present invention relates generally to systems and methods for information sharing and knowledge management, and more particularly for profiling clients within a system for harvesting community knowledge.

2. Discussion of Background Art

Satisfying information needs in a diverse, heterogeneous information environment is challenging. In order to even begin the process of finding information resources or answers to questions, individuals typically must know either where to look, or whom to ask. This is often a daunting task, especially in large enterprises where many of the members will not know each other, nor be aware of all the information resources potentially at their disposal.

Current systems for storing information and/or organizational expertise include Knowledge Databases (K-bases), such as document repositories and corporate directories, and Knowledge Management systems, which rely on users to explicitly describe their personal information, knowledge, and expertise to a centralized K-base.

FIG. 1 is a dataflow diagram of a conventional knowledge management system 100. In a typical architecture, information providing users 102 explicitly decide what descriptive information they provide to a central database 104. An information seeking user 106 then performs a query on the central database 104 in order to find an information provider who perhaps may be able to answer the seeker's question.

There are several significant problems with such systems. Knowledge management systems, like that shown in FIG. 1, require that information providers spend a significant amount of time and effort entering and updating their personal information on the central database 104. For this reasons alone, such systems tend to have very low participation rates. In addition, even those information providers, who take time to enter and update this information, may misrepresent their personal information or level of knowledge and expertise be it willfully or not. Furthermore, they may neglect or be unable to reveal much of their tacit knowledge within their personal description. Tacit knowledge is knowledge a user possesses, but which the user either does not consider important enough to enter, or which they may not even be consciously aware that they know.

Because of the inaccuracy and/or incompleteness of such personal information, information seekers, even after all of their searching efforts, may still find their questions left unanswered, perhaps because the "expert" they identified may not have the bandwidth to respond. Similarly, even information seekers who discover the existence of a relevant K-base may be required to formulate queries which are so complex that they either can not or will not bother to perform a proper search A second significant problem with knowledge management systems is the information provider's lack of privacy with respect to their personal information stored on the central database 104. No matter what agreements a knowledge management system's central database 104 provider has made with the user, the fact remains that the central database 104 provider still has the user's personal information, which means that that personal information is out of the direct control of said user. As a result, information providers may be unwilling to reveal much about themselves in the presence of a risk that their privacy would be violated. In such systems, the provider must pre-screen all information to be revealed, in order to make sure that the information provided does not contain information which the user would not be comfortable with others having access to. The resulting high participation costs often results in profiles that are stale and lack richness.

Another problem with such systems, is their lack of anonymity. Information seekers and providers cannot remain anonymous while performing queries or asking questions. As such, they may not perform a search, as a question, or wholeheartedly reveal their knowledge about a particular topic in their response to another user's question.

All of the above problems lead to free-riding by many of those using such conventional knowledge management systems. Free-riding occurs when there are information seekers who are not also information providers. They benefit from the information stored on databases, but do not contribute to them. Free-riding tends to make all users worse off, since a knowledge management system's and K-base's value depends upon the richness and fidelity of each users' contributions.

A fourth problem is cost. Conventional centralized systems require the installation of additional hardware dedicated to the knowledge management system and do not make use of otherwise unutilized resources such as the user's own personal computer.

Collaborative filtering techniques also have similar problems. Collaborative filtering is a tool for selectively presenting users with information recommendations based on the collective wisdom of the participant users. Generally these systems require users to actively mark incoming information as relevant or not relevant to their interests. A central system manages this information and attempts to group individuals with similar interests (as expressed by the ratings they assign to pieces of information). Users who seek knowledge in are then directed to information that members like them have indicated as relevant. Due to their centralized nature, these systems lack many privacy features and require heavy active participation by individuals. For this reason collaborative filtering systems frequently do not have access to rich profiles. Additionally, the information that is filtered may not address specific information needs and the user must then wade through the information or perform additional searches and may still find no answer.

In response to the concerns discussed above, what is needed is a system and method for profiling clients within a system for harvesting community knowledge that overcomes the problems of the prior art.

SUMMARY OF THE INVENTION

The present invention is a privacy-preserving system and method for profiling clients within a system for knowledge management. One embodiment of the method of the present invention includes the steps of: accessing a predetermined set of data targets; collecting data target information from the data targets; generating a client profile from the data target information; storing the profile on a client computer; receiving a message; and scoring the message with respect to the profile.

A second embodiment of the method of the present invention replaces the receiving and scoring steps with the steps of: accessing a web page; and scoring the web page with respect to the profile.

A third embodiment of the method of the present invention replaces the receiving and scoring steps with the steps of: receiving an e-mail; and scoring the e-mail with respect to the profile.

A fourth embodiment of the method of the present invention replaces the receiving and scoring steps with the steps of: opening a file; and scoring the file with respect to the profile.

A fifth embodiment of the method of the present invention includes the steps of: accessing a predetermined set of data targets; collecting data target information from the data targets; generating a client profile from the data target information; storing the profile on a client computer; receiving a message including filtering criteria; and displaying the message on the computer if the filtering criteria is found within the profile.

A sixth embodiment of the method of the present invention includes the steps of: generating a message; transmitting the message from a sending client to a set of receiving clients; accessing a predetermined set of data targets; collecting data target information from the data targets; generating a receiving client profile from the data target information; scoring the message with respect to the profile; and displaying the message on a receiving client's computer.

A seventh embodiment of the method of the present invention includes the steps of: generating a message including filtering criteria; transmitting the message from a sending client to a set of receiving clients; accessing a predetermined set of data targets; collecting data target information from the data targets; generating a receiving client profile from the data target information; scoring the message with respect to the profile; and displaying the message on the receiving client's computer if the filtering criteria is found within the profile.

The system of the present invention, includes all means for implementing the method.

These and other aspects of the invention will be recognized by those skilled in the art upon review of the detailed description, drawings, and claims set forth below.

DETAILED DESCRIPTION OF THE PREFERRED EMBODIMENT

The present invention provides a mechanism for publicly, privately, or anonymously providing information to and harvesting information from a community of users and information resources. By preserving the privacy of users and their profiles, the present invention allows for the use of automatic profiling methods. These automatic methods eliminate a need for community members to laboriously maintain their own profiles in order to efficiently participate in the knowledge community. As a result, users' profiles are a rich body of information, and users do not face high participation costs. The invention also allows for anonymous questions and responses which further provides incentives for users to participate. As a result, the present invention ameliorates the free-riding problem, and creates a low-cost, useful, user-friendly environment for knowledge sharing and expertise exchange.

Figure 1:
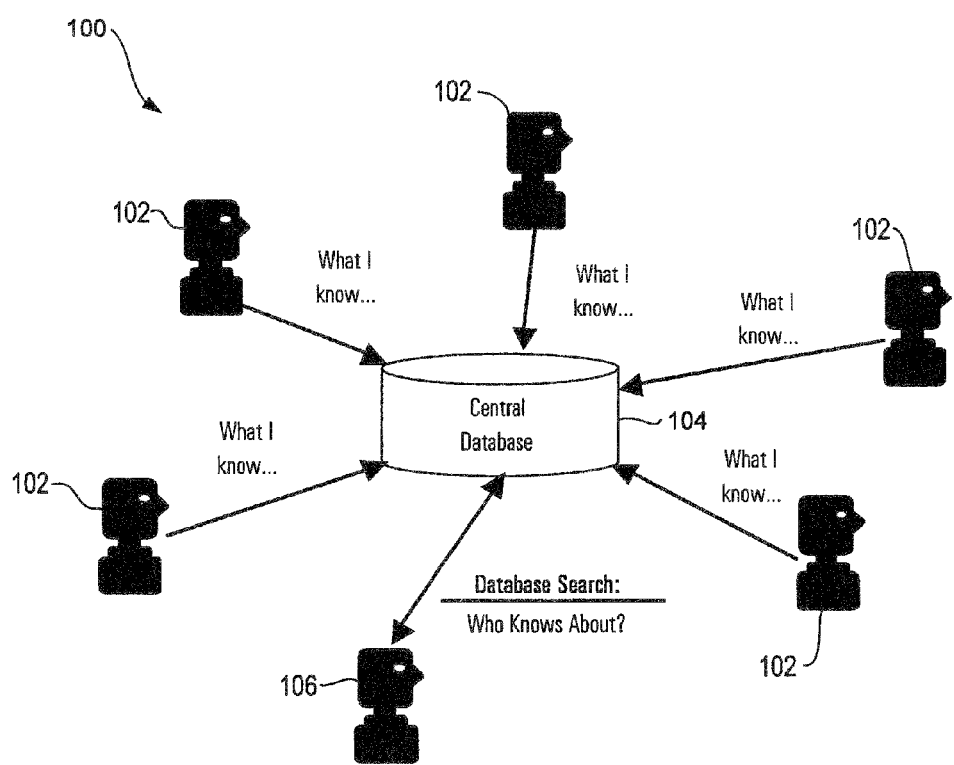
FIG. 1 is a dataflow diagram of a conventional system for knowledge management.
Figure 2:
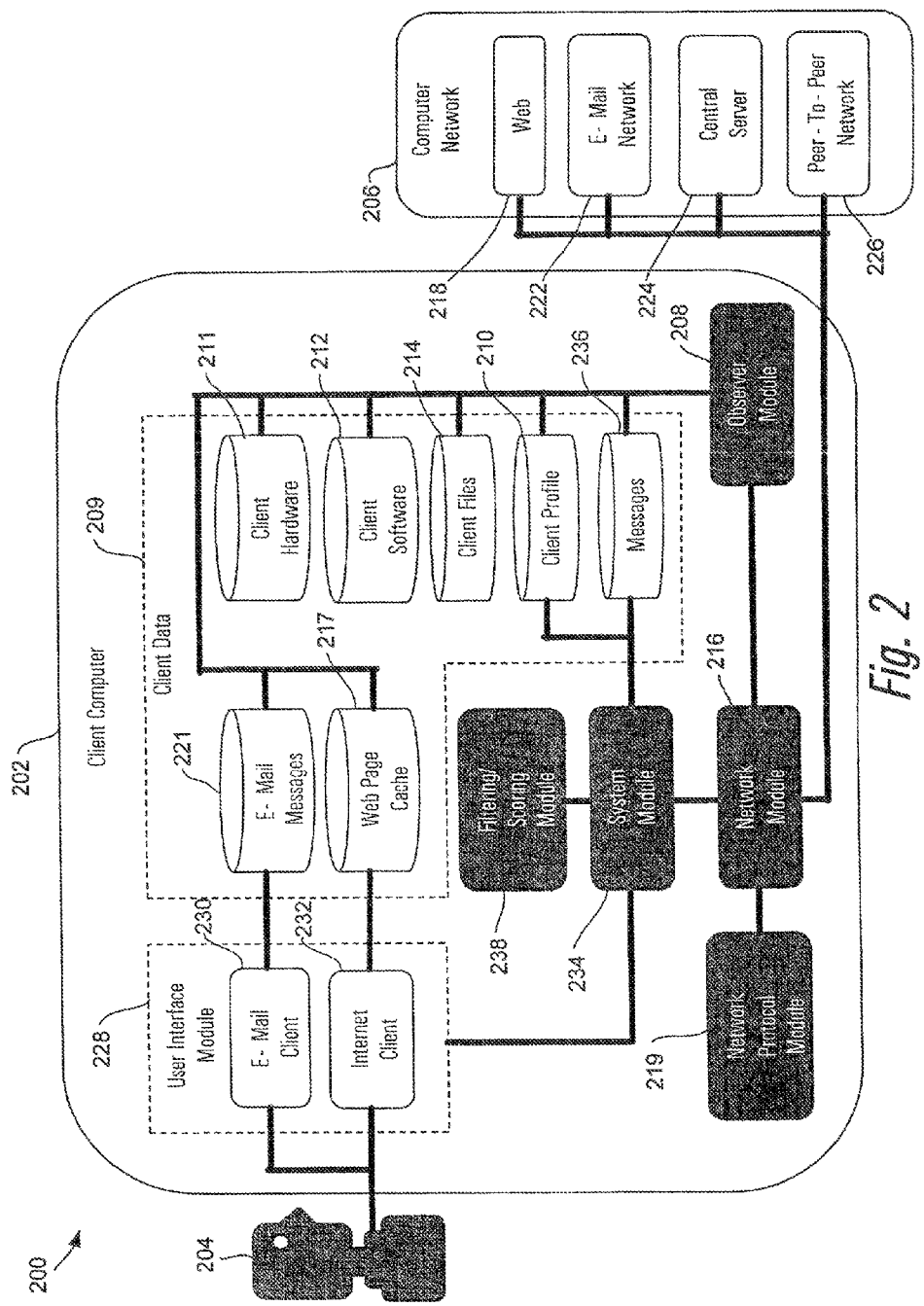
FIG. 2 is a dataflow diagram of one embodiment of a system for profiling clients within a system for harvesting community knowledge.
Figure 3:
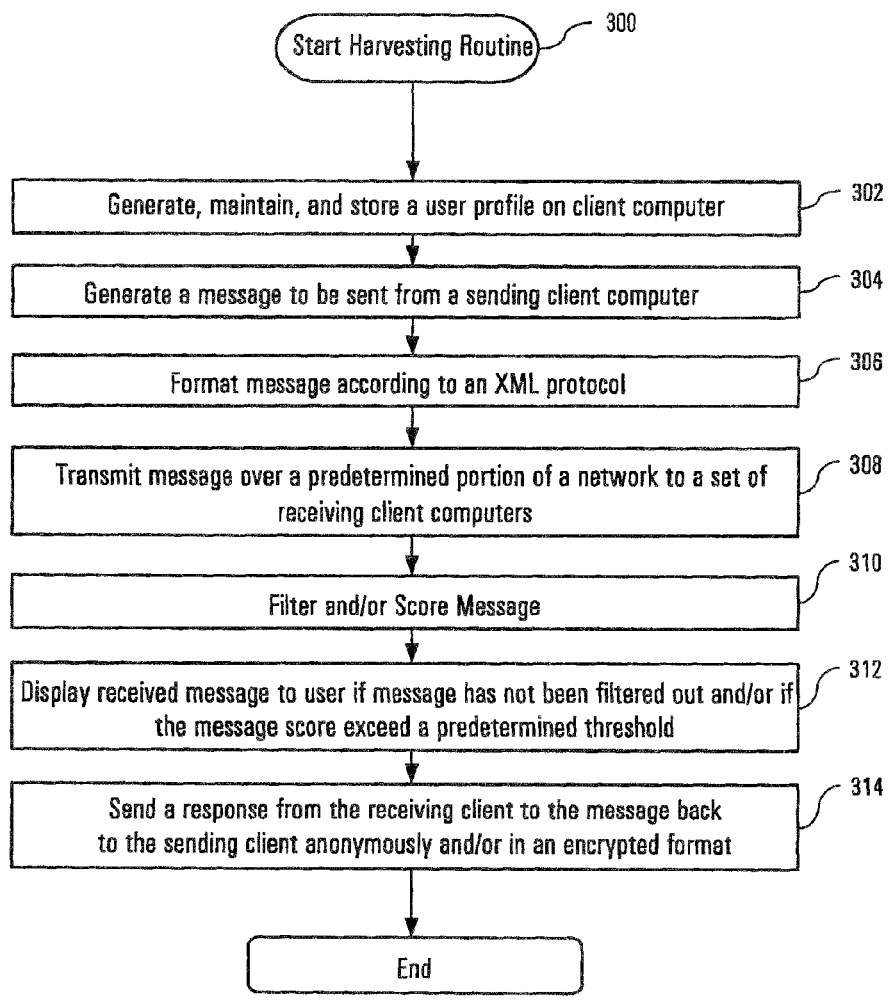
FIG. 3 is a flowchart of one embodiment of a method for harvesting community knowledge.

FIG. 2 is a dataflow diagram of one embodiment of a system 200 for harvesting community knowledge. FIG. 3 is a flowchart of one embodiment of a method 300 for harvesting community knowledge. FIGS. 2 and 3 are herein discussed together. The system 200 includes a client computer 202 under the control of a user 204, and connected to a computer network 206. The client 202 both sends and receives messages respectively to and from other client computers and information sources via the network 206.

When a client computer generates and sends a message such client computer is herein alternately called a sending client, and when a client computer receives a message, such client computer is herein alternately called a receiving client. Preferably all client computers on the network include the same functionality, which is now described with respect to the client computer 202, however some receiving clients may not currently have the present invention's software installed.

User Profiling

User profiling by the present invention, enables the system 200 to capture historical information about the user 204, as well as real-time information as the user 204 goes about their daily digital business. This knowledge is expressed indirectly in the user's 204 behavior and data stored on the client computer 202 and from the user 204 and client computer 202 interactions with the network 206.

The present invention uses an observer module 208 to automatically compile and store user profile information in a client profile 210. The client profile 210 is generated using systematic, objective and repeatable methods which can be adjusted and modified to suit any number of user environments and/or information processing end goals. Since the client profile 210 is automatically created, the user 204 is relieved from the arduous task of having to manually build their own profile. This dramatically reduces participation costs for all users of the present invention, while ensuring that the user's profile is constantly kept up to date.

Preferably, more than one data source or set of data items are profiled in order to generate a multi-dimensional understanding of the user's 204 knowledge and that the resultant user profile is of a high quality. This is because singular sources of data, such as e-mail, tend not to fully reflect a user's interests and expertise. Also, since user profiles are preferably generated on each user's own computer 202, no new hardware resources need be purchased in order to implement the present invention.

The method 300 begins in step 302 with the observer module 208 generating and maintaining the client profile 210 on the client computer 202. Step 302 is now described in more detail in FIG. 4.

Figure 4:
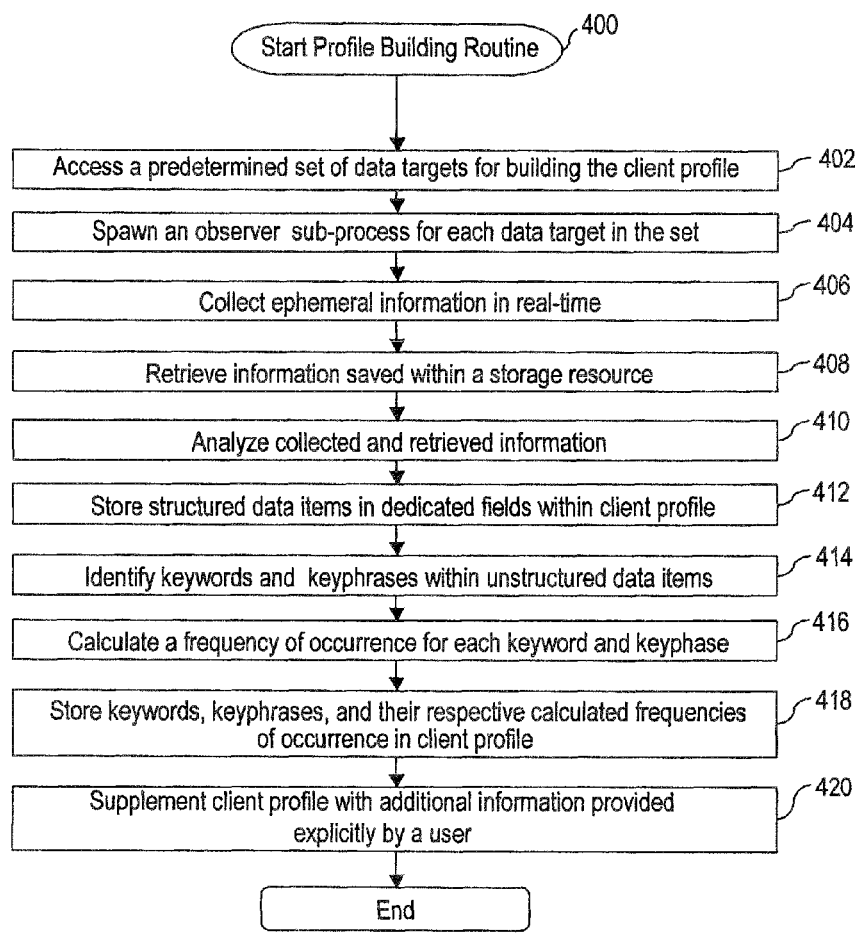
FIG. 4 is a flowchart of one embodiment of a method for profiling clients within the method for harvesting community knowledge.

FIG. 4 is a flowchart of one embodiment of a method 400 for profiling clients within the method 300 for harvesting community knowledge. The profiling method 400 begins in step 402 wherein the observer module 208 accesses a predetermined set of data targets for building the client profile 210. The set of data targets are preferably selected to provide a robust source of data for processing into a meaningful and versatile client profile 210. The data targets include information stored on the client computer 202, information accessible over the network 206, as well as which can be obtained by monitoring the user's 204 activities on the computer 202 and over the network 206.

Next in step 404, the observer module 208 spawns an observer sub-process for each data target in the set. Depending upon the data target, some of the sub-process must, in step 406, collect certain ephemeral information in real-time. Such ephemeral information may include temporarily cached data which is deleted after the data target terminates operations, network traffic information, as well as information received by the data target, such as e-mails or messages, which the user 204 subsequently deletes before said information can be permanently saved. However, information otherwise saved within a storage resource may be retrieved as needed, in step 408.

In step 410, the observer 208 analyzes the collected and retrieved information using data mining techniques. In step 412, structured data items within the collected and/or retrieved information, such as e-mail addresses or URLs, are stored in dedicated fields within the client profile 210. Unstructured data items within the collected and retrieved information, such as pure text, however are first statistically analyzed. The statistical analysis includes, first identifying a set of keywords and a set of key phrases within the unstructured data items, in step 414, and then, calculating a frequency of occurrence for each keyword and key phrase within the data item, in step 416. In step 418, the keywords, key phrases, and their respective calculated frequencies of occurrence are then stored in the client profile 210. If the keyword or key phrase already exists within the client profile 210, their frequencies of occurrence are combined. Preferably, the unstructured data itself is not stored within the client profile 210. The client profile 210 data structure is preferably that of a relational database upon which queries can be easily performed.

Thus the present invention's observer 208, by collecting, retrieving, and analyzing, information from the data targets, effectively captures the user's 204 tacit knowledge, which the user 204 themselves may not even be conscious of having knowledge, expertise, or an interest in.

In step 420, the client profile 210 may at the user's 204 discretion be supplemented with additional information provided explicitly by the user 204.

Figure 5:
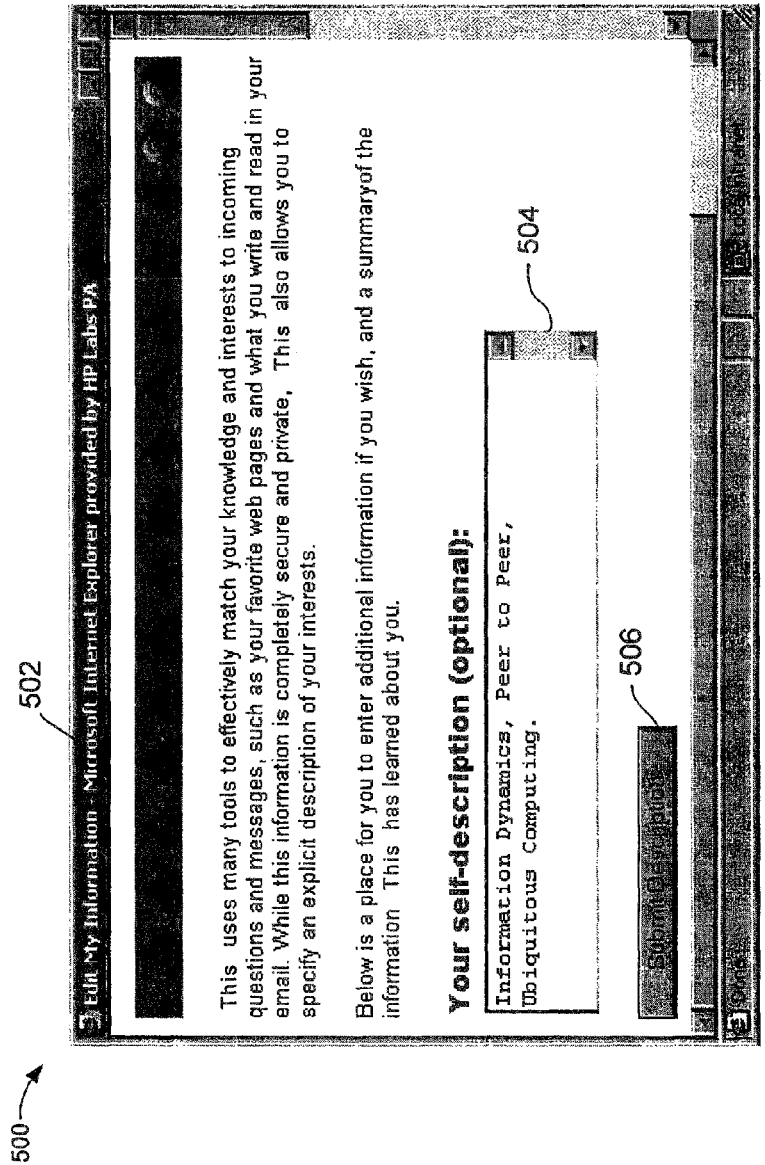
FIG. 5 is a pictorial diagram of one embodiment of a "View/Edit Declared Profile" window within the system.

FIG. 5 is a pictorial diagram 500 of one embodiment of a "View/Edit Declared Profile" window 502 within the system 200 for allowing the user 204 to supplement the client profile 210. The window 502 includes a self-description field 504 for the user 204 to explicitly describe themselves, and input their knowledge, expertise, and interests as a series of comma separated information strings. The user 204 may also add any other information which the user 204 deems relevant to other users on the network 206. A submit description button 506 adds the self-description field 504 to the client profile 210.

Figure 6:
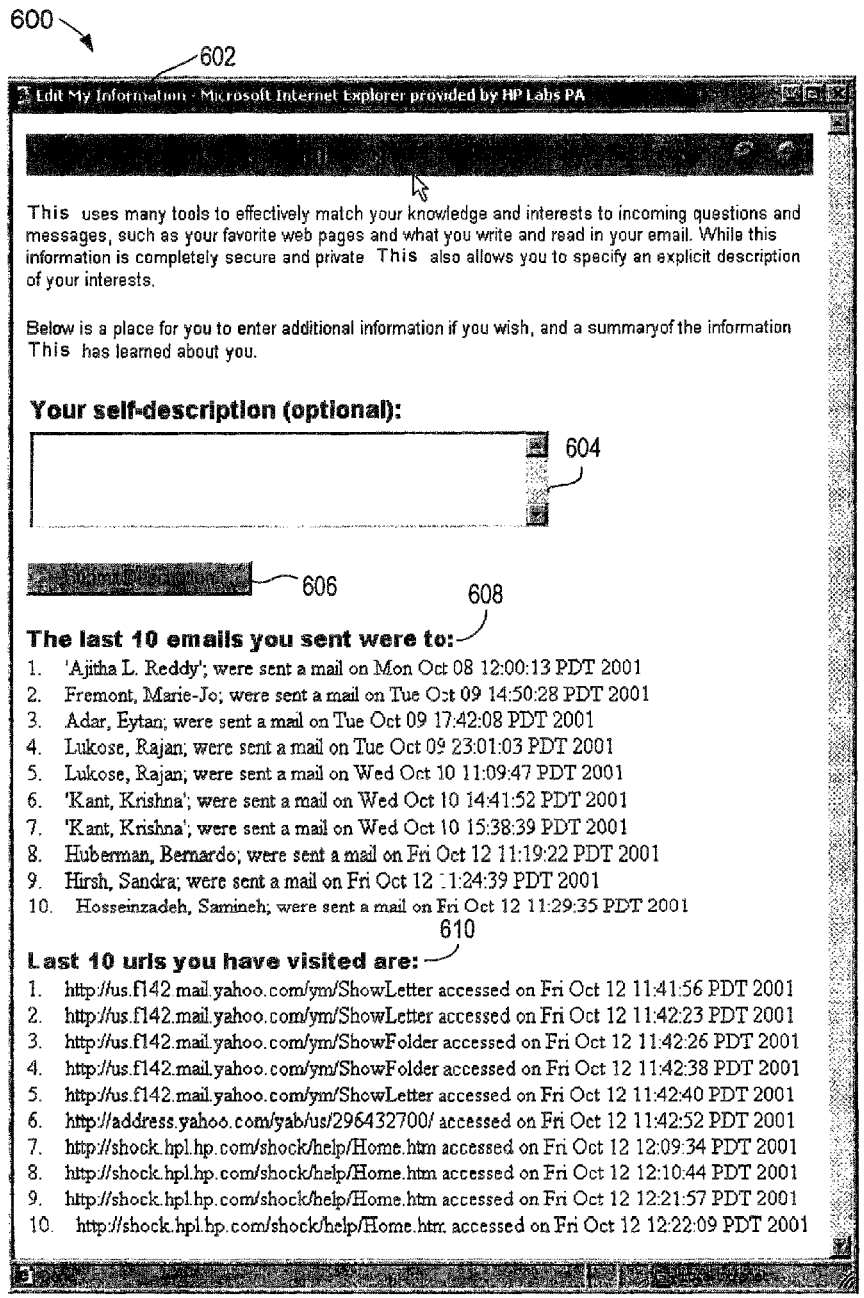
FIG. 6 is a pictorial diagram of another embodiment of a "View/Edit Declared Profile" window within the system.

FIG. 6 is a pictorial diagram 600 of another embodiment of a "View/Edit Declared Profile" window 602 within the system 200. The window 602 also includes a self-description field 602 and a submit description button 606 which function in a similar manner to the embodiment 502 described above, however, the window 602 also includes a "The last 10 emails you sent" field 608 and a "Last 10 urls you have visited" field 610. "The last 10 emails you sent" field 608 and the "Last 10 urls you have visited" field 610 are two of the structured data items collected and stored by the observer module 208 according to step 412 of the profile generation method 400.

They are provided here for the user's 204 benefit. The user 204 may select and delete individual entries if desired through a search/delete interface.

In order to maximize the user's 204 privacy and thereby encourage broad user participation within the information market, the client profile 210 is preferably stored only on the client computer 202, however the profile 210 may also be stored remotely either in encrypted or password protected form and viewable only by the user 204. Also to toward this goal, the user 204 is also preferably given an option of erasing their client profile 210, or having the observer 208 rebuild a new client profile for the user 204. A high degree of user privacy encourages users to permit the system 200 to build very rich user profiles which go far beyond those users would otherwise voluntarily disclose to a central database.

The following data targets are preferably included within the predetermined set of data targets mentioned in step 402. Specific preferred processing techniques for each of these data targets are also discussed. Those skilled in the art however will recognize that many additional data targets and processing techniques may also be employed and that a particular mix of data targets and processing techniques which yield a best client profile may vary with the set of users and network configuration to which the present invention is applied.

Message Data Targets:

Message data targets include messages routed over the peer-to-peer 226 and central server 224 networks, as well as e-mail messages routed over the e-mail network 222. E-mail is one of the most fundamental and prevalent forms of communication today and as such is considered to be a good source of user profile information. E-mail sub-processes within the observer module 208 access the e-mail messages 221 transmitted and received by the e-mail client 230 over the e-mail network 222.

Structured data items from the e-mail which are preferably stored in the client profile 210 include: the email addresses, domains, and identities for the sender and all of the recipient's; and message timestamps.

Unstructured e-mail data, consisting mainly of the body of an e-mail message, are processed according to the statistical techniques discussed above, into keywords, key phrases, and frequencies of occurrence before being stored in the client profile 210.

Behavioral data preferably stored include: which e-mails or messages the user 204 reads, stores, deletes, and/or ignores. Those e-mails or messages which the user 204 reads or stores becomes part of the user's 204 "positive-profile." Whereas those e-mails and messages which the user 204 either deletes or ignores becomes part of the user's 204 "negative-profile."

Messages processed by either the peer-to-peer 226 or central server 224 networks are similarly processed and added to the client profile 210.

Information Browsing Data Targets:

Information browsing data targets monitored by sub-processes within the observer module 208 include: data a files transmitted to or downloaded from the peer-to-peer 226 and central server 224 networks, client files 214 viewed, modified, or deleted by the user, such as word processing, spreadsheet and other files; as well as web page information routed over the web 218 by the internet client 232 into the web page cache 217.

Structured data items which are preferably stored in the client profile 210 include: URLs stored in the user's 204 bookmark and/or favorites file; web pages visited by the user or stored in the web page cache 217; identifying information from client files 214 accessed by the user 204; and time and frequency of visitation to said web pages or client files 214.

Unstructured data, consisting mainly of the body of the web pages visited and client files 214 accessed by the user, is also processed according to the statistical techniques discussed above, into keywords, key phrases, and frequencies of occurrence before being stored in the client profile 210.

Behavioral data preferably stored include: web surfing patterns and browsing behavior.

Installed Hardware and Software Data Targets:

Installed hardware and software data targets monitored by sub-processes within the observer module 208 include the client hardware 211 and software 212 installed on the computer 202. The client software 212 includes the e-mail client 230 and the internet client 232.

Structured data items which are preferably stored in the client profile 210 include: hardware 211 device information; software 212 installation and operational information, available in part from registry files within the computer 202; and dates of installation for each hardware device and software process.

Behavioral data preferably stored include: user interactions with the installed hardware 211 and software 212, such as frequency of use or reconfiguration.

Other Data Targets:

Other information sources which the observer 208 may access in order to build the client profile 210 include: user information stored in remote enterprise directories and on the central server 224. For example, user information stored within a LDAP enterprise directory can be accessed by the observer module 208 over the network 206. The user information stored on the LDAP server may include the user's department number, location, and other human resources information.

Message Generation

Next to be described is a system and method for generating messages in step 304 using the present invention. Messages are herein defined to include a wide variety of communications known to those skilled in the art, including any communication seeking, sending, and/or culling information from an information market. Thus messages can include questions, announcements, and/or information processing routines.

To begin, the user 204 accesses a user interface module 228. The user interface module 228 preferably includes a set of software modules for interfacing with the user 204. Such modules at a minimum include the e-mail client 230, which stores a predetermined set of e-mail messages 221, and the Internet client 232, which stores information in the web page cache 217. These two modules 230 and 232 provide the user 204 with alternate ways of using the present invention and preferably, both contain similar functionality, such as text windows and folders for storing messages both sent and received.

Through the user interface module 228, the user 204 initiates the message generating process, such as by clicking on an "Ask a Question" button in a toolbar within the user interface. In response, the user interface module 228 displays a number of pre-defined message types to the user 204.

After a message has been generated it is preferably assigned a globally unique identifier and stored in a messages database 236. A private-public key pair is preferably generated for each new message. The public key is then sent with the message so that a receiving client can encrypt their response, ensuring that only the user 204, having the corresponding private key, can decrypt and view such response. This provides a further level of security and privacy within the present invention.

The network module 216 periodically scans the message database 236 for new messages generated by the user 204. Then in step 306, a network protocol module 219 formats the new message according to an XML (Extensible Markup Language) protocol for transmission by the network module 216 over the network 206. Both a client computer sending the message and a client computer receiving the message must be apprised of the particular XML protocol used to format the message, in order for communication to occur.

Preferably the peer-to-peer network 226 is limited to an enterprise's intranet so that only a predetermined set of client computers on the network 206 may have an opportunity to respond to the message. By limiting the scope of users allowed to see messages, a baseline level of confidentiality, expertise, and/or message response integrity may be maintained. For instance, the scope of users may be limited to only those who are employed within a particular enterprise, who belong to a particular professional society, or who are students and one or more universities. The exact scope of users will thus depend upon a particular application of the present invention.

In alternate embodiments, messages may be transmitted over global e-mail and/or web networks, but in an encrypted format which again limits the scope of users. In other embodiments, there may be no limits on the scope of users who may be given an opportunity to respond to the messages.

Message Transmission

Next in step 308, the network module 216 transmits the message over a predetermined portion of the computer network 206. As mentioned above, when the computer client 202 transmits a message over the network 206 it is called a sending client, while when the computer client 202 receives a message over the network 206 it is called a receiving client. Thus in normal operation, all client computers function as both sending and receiving clients.

While messages transmitted over the peer-to-peer network 226 achieve a high level of anonymity, many messages will likely be transmitted over the e-mail network 222 or displayed on a web 218 site in order to advertise the present invention and thereby build-up the peer-to-peer network 226.

However, regardless of over which network portion the message is sent, each receiving client having the present invention installed stores a copy of the XML encoded message in their respective messages database.

Message Filtering and Scoring

For purpose of the discussion to follow, functionality within the client computer 202 for processing received messages is discussed as if the client computer 202 was one of the receiving client computers. Such a context switch is appropriate because preferably each client computer contains a complete and self contained version of the present invention's software.

Thus in step 310, the system module 234 within the client computer 202 retrieves, and commands a filtering/scoring module 238 to filter and score, newly received messages which have been stored in the messages database 236.

In order to perform filtering and scoring, the filtering/scoring module 238 compares the message with information stored in the user's 204 client profile 210. If necessary however, the message may be compared with data stored elsewhere in the client computer 202, such as in the e-mail client 230, the e-mail messages 221, the internet client 232, the web page cache 217, the client software 212, the client files 214, and the client messages 236.

A received message is filtered by the filtering/scoring module 238 when such message contains a predetermined set of criteria, inserted by the message sending client, in order to target selected receiving clients. Such filtering criteria is preferably very flexible and is left at the discretion of the sending client user. For example, the filtering criteria may look for a particular data string, or at some other information within a receiving client's client profile 210.

In an alternate embodiment however, a client profile 210 which does not meet the filtering criteria merely results in a low message score. In this way, a message which does not meet the filtering criteria does not automatically prevent the user 204 from seeing the message. In such embodiments an overall weighted average score may be generated which depends upon not only all of the filtering criteria, but also the message's score. How the message's score is generated is discussed next.

The filtering/scoring module 238 preferably scores messages using statistical information retrieval techniques, including linguistic analysis. Information retrieval techniques are commonly known to be used for accessing and analyzing large blocks of data and then extracting all or selected portions of such data according to a wide variety of methods. Messages which include structured or unstructured data items, which are within the user's 204 positive-profile, tend to increase the message's score. While messages which include structured and unstructured data items, which are within the user's 204 negative-profile, tend to decrease the message's score.

Other techniques for scoring the messages are also known to those skilled in the art.

While the above filtering and scoring discussion assumes the message was received over the peer-to-peer network 226, messages received over the e-mail network 222 as well as by other paths within the network 206 are similarly filtered and scored if the receiving client has the present invention's software installed.

For example, receiving clients who have the present invention's software already installed and have received an e-mail message containing an embedded XML message, have a copy of the embedded message placed in their messages database 236 so that the message can be filtered and scored. Receiving clients who do not have the present invention's software installed, however, only see the e-mail message in their standard e-mail inbox, and no other processing is performed.

Thus the filtering and scoring techniques of the present invention in combination with the rich client profiles stored on each receiving client's computer are together what enable messages to be brought to the attention of the right set of users.

Such intelligently targeted messaging, however, also builds user confidence in and reliance on the present invention. This is because unlike in conventional systems where users often have to wade though in-boxes full of junk or marginally useful e-mail, users using the present invention generally know and rely on the fact that their time will not be wasted on such unimportant messages. Instead users of the present invention will be even more likely to timely respond to messages received because the messages will be so on-point to their expertise and/or interests.

For example, in the past when a sending client needed to identify appropriate participants to participate in an experiment, or submit papers for a seminar, the user would clumsily post an advertisement on a web or other site, and/or send out a generalized e-mail to a very large distribution list. In such cases, targeted users often miss the importance of or are annoyed by such communications which are buried in a sea of information they already are trying to sift through. In contrast, the present invention automatically performs the necessary sifting so that if a user receives a message using the present invention, such message will be useful to them.

Message Display and Response

In step 312, the received message is displayed to the receiving client if the message has not been filtered out and/or if the message score exceeds a predetermined threshold. Messages are preferably displayed to the receiving client according to their respective score. As discussed above, the score represents a likelihood that the receiving client will find the message relevant to or within their expertise.

The receiving client then may select and respond to one of the messages. In step 314 a response from the receiving client is sent over the network 206 back to the sending client anonymously or in an encrypted format. After step 314 the preferred method ends.

Processing Information from other Sources Using the Present Invention

While the present invention has been discussed with respect to the generation, transmission and response to messages, the present inventions' user profiling and scoring functionality is equally applicable toward processing other types of information as well. Other information includes data displayed within a current web page being viewed by the user 204. A relevance vector could be generated from said web page data and compared to the user's 204 expertise vector generated from the client profile 210. User's would be notified of a particular relevance of the currently viewed web page if the relevance and expertise vectors when compared yield a score which exceeds a predetermined threshold. In this way user's browsing the web could be apprised of particular web pages which may closely align with their interests and/or expertise.

Other information similarly processed and scored may include: normal e-mail messages which have not been generated using the present inventions' functionality; files downloaded from the central server 224 or received from some other source; or expertise information stored on a central enterprise database. Those skilled in the art will know of other information sources to which the present invention may also be successfully applied.

While one or more embodiments of the present invention have been described, those skilled in the art will recognize that various modifications may be made. Variations upon and modifications to these embodiments are provided by the present invention, which is limited only by the following claims.

What is claimed is:

1. A method comprising:
   accessing a set of data targets;
   collecting data target information from the data targets, wherein the data target information includes user behavioral data with respect to the data targets, the user behavioral data indicating which data targets a user reads and stores and which data targets the user ignores and deletes;
   generating a client profile from the data target information, the client profile including keywords and associated frequencies of occurrence of the respective keywords in the data targets;
   storing the client profile on a client computer;
   receiving a data target at the client computer; and
   scoring, by the client computer, the received data target using the client profile that includes the keywords and the associated frequencies.

2. The method of claim 1, wherein the data targets include messages, wherein the data target information includes the user behavioral data indicating which messages the user reads and stores and which messages the user ignores and deletes, and wherein the keywords are keywords in the messages, and the client profile includes the associated frequencies of occurrence of the respective keywords in the messages.

3. The method of claim 2, wherein the data targets further include files and the data target information further includes user behavioral data indicating which files the user views, modifies, and deletes, and wherein the keywords in the client profile further include keywords in the files, and the client profile includes the associated frequencies of occurrence of the respective keywords in the files.

4. The method of claim 2, wherein the data targets further include web pages and the data target information further includes user behavioral data indicating which web pages the user visits, and wherein the keywords in the client profile further includes keywords in the web pages, and the client profile includes the associated frequencies of occurrence of the respective keywords in the web pages.

5. The method of claim 2, wherein the data targets further include hardware and software on the client computer, and wherein the data target information further includes user behavioral data relating to interaction between the user and the hardware or software, and wherein the scoring is further based on the user behavioral data relating to the interaction.

6. The method of claim 1, wherein generating the client profile comprises generating the client profile that further includes key phrases in the data targets and associated frequencies of occurrence of the key phrases in the data targets.

7. The method of claim 1, wherein the keywords are part of unstructured data in the data targets, and wherein collecting data target information further comprises collecting structured data including at least one from among email addresses and uniform resource locators (URLs), wherein the client profile further includes the at least one from among the email addresses and URLs, and wherein the scoring is further based on the at least one from among the email addresses and URLs.

8. The method of claim 1, wherein the client profile includes a positive profile and a negative profile, wherein the positive profile includes user behavioral data with respect to the data targets the user reads or stores, and the negative profile includes user behavioral data with respect to the data targets the user ignores or deletes, and
wherein the scoring includes providing a higher score for the received data target if the received data target includes content matching content of the positive profile, and providing a lower score for the received data target if the received data target includes content matching content of the negative profile.

9. The method of claim 1, wherein the generating includes:
identifying unstructured data within the data target information; and
performing a statistical analysis on the unstructured data to identify the keywords and calculate the associated frequencies of occurrence of the keywords.

10. The method of claim 9, wherein performing the statistical analysis further identifies key phrases and calculates associated frequencies of occurrence of the key phrases within the unstructured data.

11. The method of claim 1, wherein the storing includes storing the client profile only on the client computer.

12. The method of claim 1, wherein scoring the received data target comprises scoring a received message.

13. The method of claim 12, further comprising:
displaying the received message if a score produced by the scoring exceeds a threshold; and
not displaying the received message if the score is less than the threshold.

14. A system comprising:
a computer including a network module to communicate over a network, and at least one processor to:
access data targets;
collect data target information from the data targets, wherein the data target information includes user behavioral data with respect to the data targets, the user behavioral data indicating which data targets a user reads and stores and which data targets the user ignores and deletes;
generate a client profile from the data target information, the client profile including keywords and associated frequencies of occurrence of the respective keywords in the data targets;
receive a data target; and
score the received data target using the client profile, wherein the scoring is based on the keywords and the associated frequencies.

15. The system of claim 14, wherein the data targets include messages, wherein the data target information includes the user behavioral data indicating which messages the user reads and stores and which messages the user ignores and deletes, and wherein the keywords are keywords in the messages.

16. The system of claim 15, wherein the data targets further include files and the data target information further includes user behavioral data indicating which files the user views, modifies, and deletes, wherein the keywords in the client profile further includes keywords in the files, and wherein the scoring is further based on the keywords in the files and the associated frequencies of the keywords in the files.

17. The system of claim 15, wherein scoring the received data target comprises scoring a received message, the scoring based on determining whether content of the received message is present in the client profile.

18. The system of claim 14, wherein the generated client profile further comprises key phrases and associated frequencies of occurrence of the key phrases in the data targets.

19. The system of claim 14, wherein the keywords are part of unstructured data in the data targets, and wherein collecting the data target information further comprises collecting structured data including at least one from among email addresses and uniform resource locators (URLs), and wherein the client profile further includes the at least one from among the email addresses and URLs, and wherein the scoring is further based on the at least one from among the email addresses and URLs.

20. The system of claim 14, wherein the client profile includes a positive profile and a negative profile, wherein the positive profile includes user behavioral data with respect to the data targets the user reads or stores, and the negative profile includes user behavioral data with respect to the data targets the user ignores or deletes, and
wherein the scoring includes providing a higher score for the received data target if the received data target includes content matching content of the positive profile, and providing a lower score for the received data target if the received data target incudes content matching content of the negative profile.

* * * * *